United States Patent [19]
Wille et al.

[11] Patent Number: 6,160,817
[45] Date of Patent: Dec. 12, 2000

[54] METHOD FOR USING NARROWBAND PERFORMANCE FEATURES PROVIDED IN BROADBAND COMMUNICATIONS TERMINALS, IN BROADBAND NETWORKS

[75] Inventors: Klaus Wille, München; Michael Tietsch, Kaufering; Werner Stöckl, Baierbrunn, all of Germany

[73] Assignee: Siemens Aktiengesellschaft, Munich, Germany

[21] Appl. No.: 09/431,577

[22] Filed: Nov. 1, 1999

Related U.S. Application Data

[63] Continuation of application No. PCT/DE98/01147, Apr. 24, 1998.

[30] Foreign Application Priority Data

Apr. 30, 1997 [DE] Germany .......................... 197 18 440

[51] Int. Cl.⁷ .......................... H04L 12/413; H04M 7/00; H04J 3/16; H04J 3/22
[52] U.S. Cl. .......................... 370/467; 370/445; 370/466; 370/465; 370/522; 379/225; 379/229
[58] Field of Search .......................... 370/445, 466, 370/465, 467, 469, 470, 766, 522, 523, 442, 535; 375/293; 379/229, 225, 268

[56] References Cited

U.S. PATENT DOCUMENTS

| | | |
|---|---|---|
| 5,345,446 | 9/1994 | Hiller et al. .......................... 370/60.1 |
| 5,440,554 | 8/1995 | Stannard et al. .......................... 370/60.1 |
| 5,521,924 | 5/1996 | Kakuma et al. .......................... 370/522 |
| 5,802,045 | 9/1998 | Kos et al. .......................... 370/352 |
| 5,825,780 | 10/1998 | Christie .......................... 370/522 |
| 5,848,070 | 12/1998 | Durvaux et al. .......................... 370/442 |

FOREIGN PATENT DOCUMENTS

| | | |
|---|---|---|
| 0711052A1 | 5/1996 | European Pat. Off. . |
| 3802099C1 | 4/1913 | Germany . |
| 4225389C1 | 9/1930 | Germany . |
| 4002862A1 | 8/1991 | Germany . |
| 4221474A1 | 10/1992 | Germany . |
| 4224388C1 | 7/1993 | Germany . |
| 4314791A1 | 11/1994 | Germany . |
| 4304195C2 | 4/1995 | Germany . |

*Primary Examiner*—Huy D. Vu
*Assistant Examiner*—M. Phan
*Attorney, Agent, or Firm*—Herbert L. Lerner; Laurence A. Greenberg; Werner H. Stemer

[57] ABSTRACT

A method for using narrowband performance features provided in broadband communications terminals, in broadband networks, includes switching respective connections to an interworking unit through the broadband network. Signaling information which is contained therein is transmitted to a logic narrowband switching unit and an item of narrowband control information is derived therefrom. In the interworking unit, that information is converted into an item of broadband control information and a physical broadband switching unit for switching the respective connection is thus set.

6 Claims, 2 Drawing Sheets

METHOD FOR USING NARROWBAND PERFORMANCE FEATURES PROVIDED IN BROADBAND COMMUNICATIONS TERMINALS, IN BROADBAND NETWORKS

CROSS-REFERENCE TO RELATED APPLICATION

This application is a continuation of copending International Application No. PCT/DE98/01147, filed Apr. 24, 1998, which designated the United States.

BACKGROUND OF THE INVENTION

Field of the Invention

The invention relates to a method for using narrowband performance features provided in broadband communications terminals, in broadband networks.

Broadband networks are predominantly constructed according to an asynchronous transfer mode, which is known in the specialist field as ATM and is referred to as such below. The information which is to be transferred or switched is packetized into ATM cells and is switched through the use of an ATM cell header that precedes the ATM cells. A source address and destination address are specified in the user information field of a signaling ATM cell, in which the source address represents a broadband communications terminal that initiates a connection setup and the destination address represents a broadband communications terminal to which the broadband communications terminal that initiates the connection setup is connected. Virtual path and channel information is specified in the cell headers of the ATM cells, with the path which is used by the respective connection and the virtual channel of a broadband connection being determined by that information. In the future, narrowband services will also be used and/or required in the broadband networks. Those services are, for example, a telephone service in a broadband communications terminal such as a personal computer. The performance features, such as call forwarding, etc., which are customary in narrowband networks, for example the telephone network or ISDN network, will be made available to a user of a narrowband service or narrowband function.

German Patent DE 42 24 388 C1 describes a method in which ISDN narrowband communications terminals are connected to an ISDN narrowband communications system through an ATM communications network. The narrowband user information and narrowband signaling information is transmitted cell-by-cell on dedicated connections in the ATM communications network using two network gateways. In that case, the ATM communications network is used as a feeder network for ISDN narrowband communications terminals which are to be connected to ISDN narrowband communications systems, i.e. 2×64 kbit/s narrowband user channels and one 16 kbit/s signaling channel.

Furthermore, European Patent Application EP 0 711 052 A1 discloses a method which can make known narrowband performance features available on a connection between broadband communications terminals leading through an ATM communications system. In order to accomplish that, the ATM communications system is connected to a narrowband communications system through an interworking unit. ATM-specific signaling information which is transferred from the ATM communications system to the interworking unit through the use of ATM cells is converted by that unit into narrowband-specific signaling information and passed on to the narrowband communications system. The narrowband communications system determines corresponding narrowband control information through the use of the received signaling information and transfers that control information back to the interworking unit. The interworking unit in turn converts the received narrowband control information into ATM-specific control information and transfers it back to the ATM communications system.

SUMMARY OF THE INVENTION

It is accordingly an object of the invention to provide a method for using narrowband performance features provided in broadband communications terminals, in broadband networks, which overcomes the hereinafore-mentioned disadvantages of the heretofore-known methods of this general type.

With the foregoing and other objects in view there is provided, in accordance with the invention, a method for using narrowband performance features provided in broadband communications terminals, in broadband networks, which comprises switching connections provided for the use of narrowband performance features, through the broadband network, to an interworking unit connected to the broadband network; extracting from broadband network information narrowband signaling information provided in the interworking unit for the use of narrowband performance features and transferred transparently through the broadband network; deriving an item of narrowband control information from the transferred narrowband signaling information in a logic narrowband switching unit connected to the interworking unit; converting the narrowband control information into an item of broadband control information in the interworking unit; and setting a physical broadband switching unit in the interworking unit using the broadband control information, causing a respective connection provided for the use of narrowband performance features, that is user information, to be switched in a broadband network manner to a broadband communications terminal determined by the narrowband signaling information.

The essential advantage of the method according to the invention is the fact that the use of narrowband performance features of broadband communications terminals loads the broadband communications network to a small degree due to the transparent transmission of the narrowband signaling information to a logic narrowband switching unit through an interworking unit, with the broadband functions being controlled by the broadband communications network. A further advantage of the method according to the invention is the fact that upon connections from broadband communications terminals with narrowband functions, the narrowband user information which is transferred to the interworking unit through the broadband communications network is switched in a broadband network manner.

In accordance with another mode of the invention, when the broadband communications network is implemented as an ATM (Asynchronous Transfer Mode) communications network, the user information which is packetized into ATM cells is not depacketized and packetized again after narrowband switching but rather packetized into ATM cells and switched in a physical broadband switching unit in the manner of an ATM communications network. The conversion work can thus be considerably reduced.

In accordance with a further mode of the invention, connections from broadband communications terminals which are provided for the use of narrowband performance features are switched to narrowband communications terminals using a physical narrowband switching unit, with the physical narrowband switching unit being set through the use of an item of narrowband control information which has been derived from the narrowband signaling information in the logic narrowband switching unit, and with the user information of the respective connection being extracted from the broadband information or inserted into it in the interworking unit and transferred to the narrowband switching unit or received from it. The physical narrowband switching unit is provided only for connections from broadband communications terminals with narrowband functions to narrowband communications terminals and consequently has to be dimensioned for low traffic volumes, i.e. small narrowband switching matrices are sufficient.

In accordance with an added mode of the invention, the information is transferred in the broadband network in an asynchronous transfer mode, with the user information and narrowband signaling information being transferred transparently in ATM cells through the broadband network. Due to the transparent transmission, no additional switching measures are necessary in ATM broadband networks.

In accordance with a concomitant mode of the invention, the interworking unit can be integrated into a narrowband communications system or into a narrowband server.

Other features which are considered as characteristic for the invention are set forth in the appended claims.

Although the invention is illustrated and described herein as embodied in a method for using narrowband performance features provided in broadband communications terminals, in broadband networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
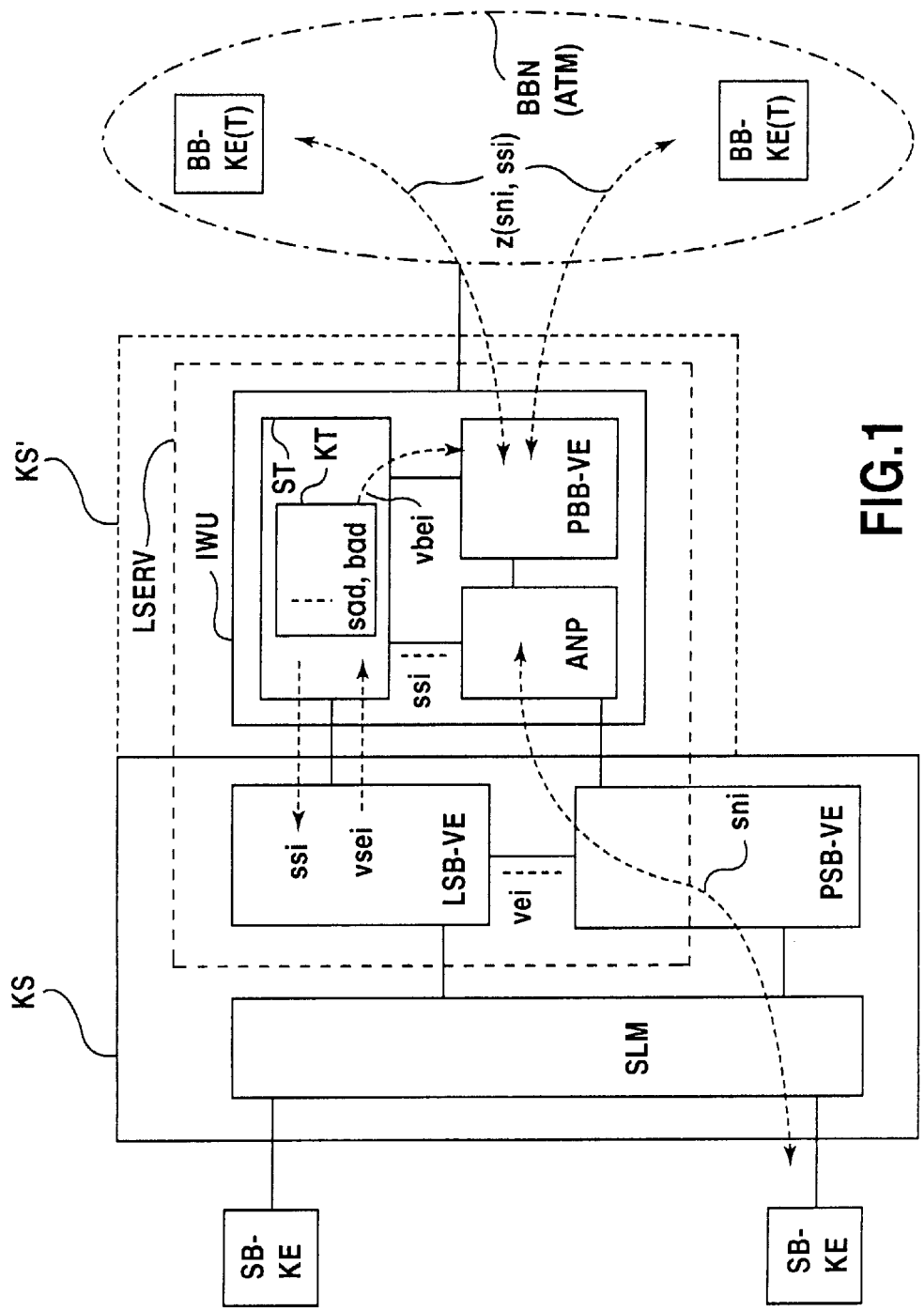
FIG. 1 is a block circuit diagram illustrating an integration of an interworking unit for implementation of narrowband performance features in broadband networks.

Referring now to the figures of the drawings in detail and first, particularly, to FIG. 1 thereof, there is seen a broadband communications network BBN which is indicated by a dot-dash line and in which, by way of example, two broadband communications terminals BB-KE are illustrated. The broadband network BBN is connected to a physical broadband switching unit PBB-VE of an interworking unit IWU to which a control unit ST and an adaptation unit ANP are connected. The control unit ST is connected to a logic narrowband switching unit LSB-VE, and the adaptation unit ANP is connected to a physical narrowband switching unit PSB-VE. The logic and physical narrowband switching units LSB-VE, PSB-VE constitute components of a communications system KS in which a subscriber line unit SLM is also provided. The subscriber line unit SLM is connected both to the logic narrowband switching unit LSB-VE and to the physical narrowband switching unit PSB-VE. The physical switching unit PSB-VE is controlled by the logic narrowband switching unit LSB-VE which is connected to the latter, using corresponding switching setting information vei. Usually, the physical narrowband switching unit BSB-VE is implemented through the use of a time-division multiplex-oriented switching matrix and the logic narrowband switching device LSB-VE is implemented through the use of a processor-controlled switching controller.

Narrowband communications terminals SB-KE are connected to the subscriber line unit SLM which is formed by a plurality of non-illustrated subscriber line modules. The narrowband communications terminals SB-KE constitute, for example, subscriber terminals or ISDN subscriber terminals. The broadband communications terminals BB-KE represented in the broadband network BBN constitute, for example, personal computers in which a narrowband function, in particular a telephone function, is implemented, as is represented in FIG. 1 by a letter T in brackets.

In the exemplary embodiment it has been assumed that the broadband network BBN is implemented through the use of an ATM communications network ATM, as is indicated in FIG. 1 by letters ATM in brackets. In this case when there is a communications connection between the broadband communications terminals BB-KE, the user information and signaling information which is to be transferred is packetized in ATM cells in those terminals and transferred through the broadband network BBN or switched through the use of that network in accordance with the virtual path and channel information inserted into the ATM cells.

In addition to these broadband communications connections within the broadband network BBN, narrowband communications connections can also be initiated or set up both between the broadband communications terminals BB-KE with narrowband functions T of the broadband network BBN and to the narrowband communications terminals SB-KE. According to the invention, all of the narrowband performance features should be available or usable for such narrowband communications connections. In order to implement the narrowband performance features, i.e. in particular the switching control of the narrowband performance features, the logic narrowband switching units LSB-VE are provided in the known narrowband communications systems KS. In order to ensure that these narrowband performance features can be made usable for the narrowband function T in the broadband communications terminals BB-KE, the interworking unit IWU is inserted between the logic narrowband switching unit LSB-VE and the broadband network BBN. The information which has been transferred in a broadband-compatible way, that is narrowband signaling information and narrowband user information, is extracted from the cells through the use of the interworking unit IWU and transferred to the logic or physical narrowband switching unit LSB-VE, PSB-VE.

When there is a narrowband communications connection between broadband communications terminals BB-KE, only narrowband signaling information ssi is extracted from the ATM cells in the adaptation unit ANP, and it is passed on to the logic narrowband switching unit LSB-VE. In the logic narrowband switching unit LSB-VE, an item of narrowband setting information vsei is determined and transferred to the control unit ST of the interworking unit IWU. In the latter, the narrowband setting information vsei is converted into an item of switching broadband setting information vbei and transferred to the physical broadband switching unit PBB-VE which is disposed in the interworking unit IWU and is set by the switching broadband setting information vbei in such a way that narrowband user information sni which is still packetized in ATM cells is switched directly to the addressed destination broadband communications terminal BB-KE. For this purpose, a narrowband destination address sad which is contained in the narrowband signaling information ssi is converted into a broadband destination address bad in the control unit ST. This conversion is carried out by using a conversion table KT in which a narrowband destination address sad and in each case an assigned broadband destination address bad, is specified for each broadband communications terminal BB-KE that is disposed in the broadband network BBN and has a narrowband function (T). This broadband destination address bad represents the switching broadband setting information vbei and is transferred to the physical broadband switching unit BB-VE, which is set in accordance with the transferred switching broadband setting information vbei or a connection set-up is initiated.

If only communications connections between broadband communications terminals BB-KE (T) with a narrowband function T are provided, only the interworking unit IWU and the logic narrowband switching unit LSB-VE are necessary in order to use performance features in these broadband communications terminals BB-KE (T). These two units LSB-VE, IWU are combined to form one performance feature server LSERV and are capable of being connected to a port of the broadband network BBN. The performance feature server is represented in FIG. 1 by a dashed line designated by reference symbol LSERV.

In the case of communications connections to the narrowband communications terminals SB-KE, the subscriber line unit SLM, which is disposed in the communications system KS, and the physical narrowband switching unit PSB-VE, are additionally provided. In this case, in particular the voice band user information sni, for example digitized voice information, is switched through the physical narrowband switching unit PSB-VE to the narrowband communications terminal SB-KE which is determined by the narrowband signaling information. In the case of communications connections between broadband communications terminals BB-KE with a narrowband function T and with narrowband communications terminals SB-KE, the use of a communications system KS or a switching system, for example an ISDN switching system, is advantageous. The logic narrowband switching unit LSB-VE, which is usually already present, is used in that system and the interworking unit IWU is integrated either externally in a separate unit or into the communications system, as is indicated by dotted lines with a designation KS'.

Figure 2:
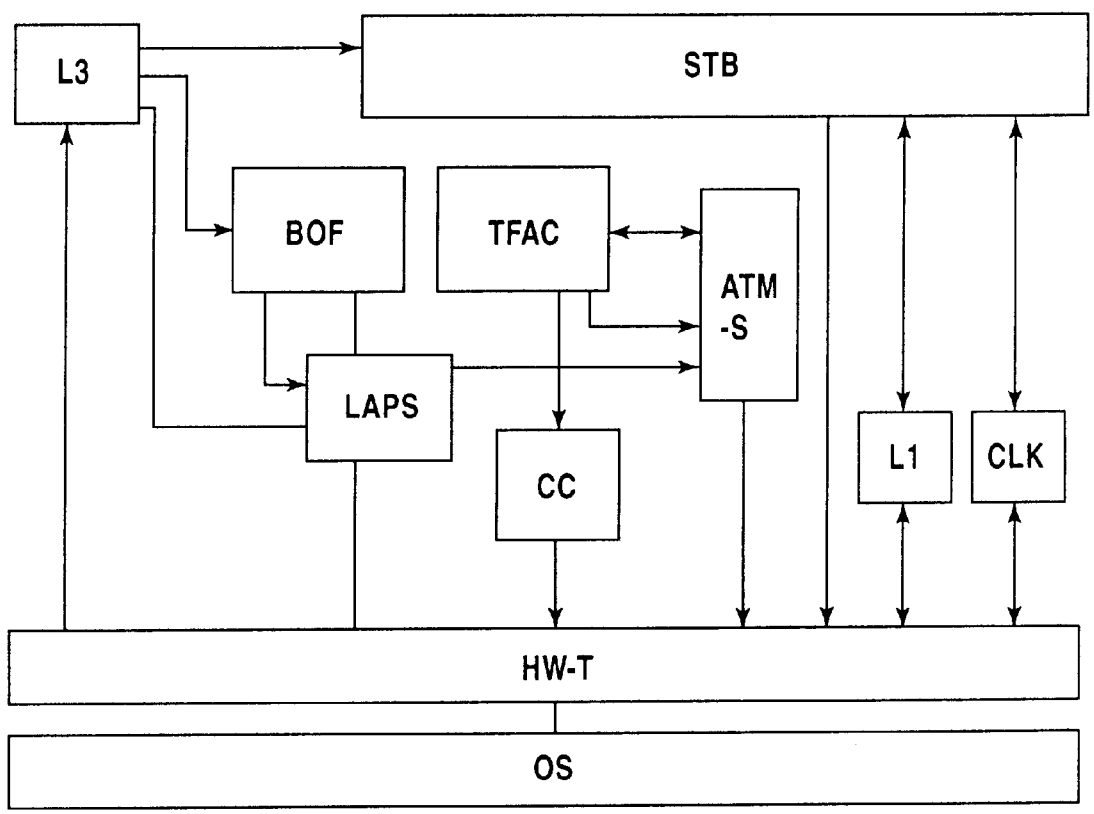
FIG. 2 is a block circuit diagram showing a structure of an interworking unit.

FIG. 2 shows a software structure of the interworking unit IWU in a block circuit diagram. In this case, an operating system OS constitutes an interface between hardware and software. A sum of all hardware drivers HW-T is represented in FIG. 2 by a single rectangle designated by reference symbol HW-T. These hardware drivers HW-T communicate with a connection control module CC, a layer 1 module L1, a clock module CLK, a signaling module LAPS, a layer 3 module L3 and a security and operating equipment module STB. The security and operating equipment module STB communicates directly with the layer 1 module L1, with the layer 3 module L3 and the clock module CLK. The layer 3 module L3 transfers information both to the security and operating equipment module STB and to the signaling module LAPS. The signaling module LAPS in turn transfers the information which has been evaluated or formed to an ATM signaling module ATM-S, which also communicates with the hardware driver HW-T. Furthermore, an operator interface module BOF and a control module TFAC, which communicate with the signaling modules ATM-S, LAPS and the connection controller CC, are also provided.

The control module TFAC is provided for controlling the switching of the narrowband user information sni or narrowband time slots. Furthermore, processes and configuration data relating to security and operating equipment and software and hardware alarms are handled in the security and operating equipment module STB. The signaling module LAPS processes a layer 2 within the protocol layers for the signaling to the connected communications terminals KE or implements the security layer 2 for the communications exchange with the communications terminals KE. The connection controller CC controls switching through of the narrowband user channels and switching through of broadband channels including virtual path information and channel information which is necessary therefor. Essentially, the hardware control or physical control of the narrowband and broadband user channels are controlled in this connection controller CC independently of the higher layers of the switching controller. Through the use of the layer 3 module L3, the messages, in particular signaling information, which are transferred by the connection controller CC, are distributed to the corresponding units that are provided for further processing, in particular to the control module TFAC, the operator interface unit BOF and the signaling module LAPS. The ATM signaling unit ATM-S handles the layer 3 signaling information within the protocol layers in the direction of the broadband network BBN, for example in accordance with an AAL5 layer (ATM Adaptation Layer) of a standardized ATM protocol, for example in accordance with an ATM forum standard. In addition the layer 2, i.e. the security layer, of the signaling information which is to be transferred to the broadband network BBN, is implemented and reversed in this module ATM-S. The control module TFAC is provided for processing narrowband signaling information which is transferred through the broadband network BBN, for example source and destination call numbers, and the transferred broadband signaling information during connection set-up and during a connection. Through the use of the operator interface module BOF, information which is adapted to the interface of the broadband communications terminals KBB-KE with a narrowband function (T) is formed, with adaptation to a control of the operator interface in the stimulus mode being carried out.

We claim:

1. In a method for using narrowband performance features provided in broadband communications terminals, in broadband networks, the improvement which comprises:

switching connections provided for the use of narrowband performance features, through the broadband network, to an interworking unit connected to the broadband network;

extracting from broadband network information narrowband signaling information provided in the interworking unit for the use of narrowband performance features and transferred transparently through the broadband network;

deriving an item of narrowband control information from the transferred narrowband signaling information in a logic narrowband switching unit connected to the interworking unit;

converting the narrowband control information into an item of broadband control information in the interworking unit; and setting a physical broadband switching unit in the interworking unit using the broadband control information, causing a respective connection provided for the use of narrowband performance features to be switched in a broadband network manner to a broadband communications terminal determined by the narrowband signaling information.

2. The method according to claim 1, which further comprises:

switching connections from the broadband communications terminals provided for the use of narrowband performance features to narrowband communications terminals using a physical narrowband switching unit;

setting the physical narrowband switching unit by an item of narrowband control information derived from the narrowband signaling information in the logic narrowband switching unit; and extracting narrowband user information of the respective connection from or inserting the narrowband user information of the respective connection into the broadband information in the interworking unit, and transferring the narrowband user information of the respective connection to the physical narrowband switching unit or receiving the narrowband user information of the respective connection from the physical narrowband switching unit.

3. The method according to claim 2, which comprises transferring information in the broadband network in an asynchronous transfer mode, and transferring narrowband user information and narrowband signaling information transparently in ATM cells through the broadband network.

4. The method according to claim 2, which comprises representing the logic narrowband switching unit and the physical narrowband switching unit by a communications system for the connection of the narrowband communications terminals.

5. The method according to claim 4, which comprises integrating the interworking unit into the communications system.

6. The method according to claim 1, which comprises combining the interworking unit and the logic narrowband switching unit in a narrowband server.

* * * * *